Jan. 28, 1969
A. H. JORDAN ET AL
3,423,849
EDUCATIONAL APPARATUS
Filed June 30, 1966
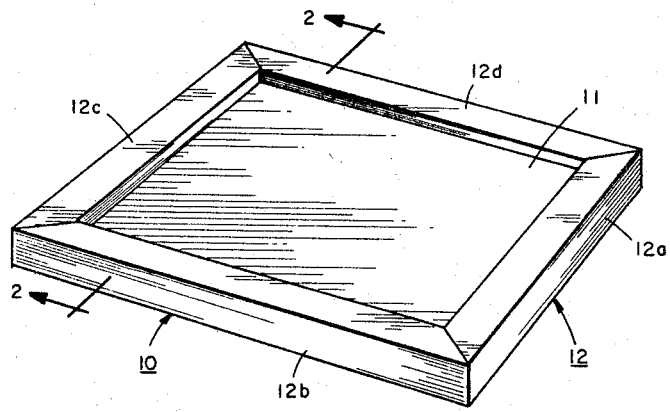
Fig. 1.
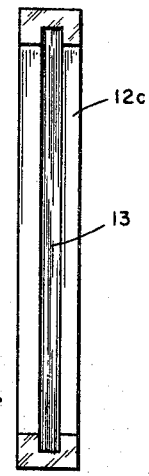
Fig. 1a.
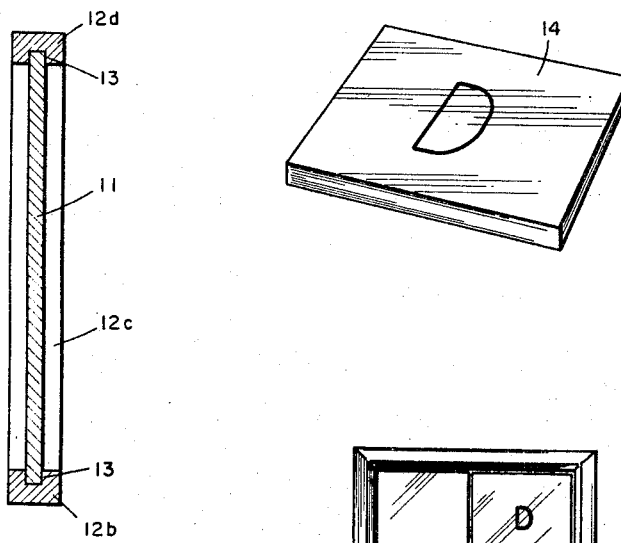
Fig. 2.
Fig. 3.
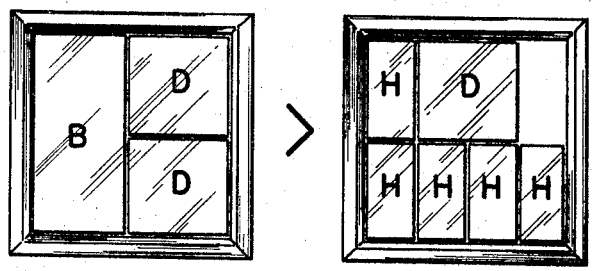
Fig. 5.
INVENTORS.
ALFRED H. JORDAN
RUTH E. FISKE
BY R. J. Frank
ATTORNEY.

United States Patent Office 3,423,849
Patented Jan. 28, 1969

3,423,849
EDUCATIONAL APPARATUS
Alfred H. Jordan and Ruth E. Fiske, Wilton, Conn., assignors to Eastview Corporation, a corporation of New York
Filed June 30, 1966, Ser. No. 561,798
U.S. Cl. 35—30                                6 Claims
Int. Cl. G09b 23/02, 1/06

ABSTRACT OF THE DISCLOSURE

An educational device for teaching algebraic concepts to young children consisting of a set of N identical trays and N groups of indicia elements, the number of indicia elements being at least $N(N+1)/2$. Each group comprises a unique number of indicia elements and each element in the group has a surface area equal to the area of the tray divided by the number of elements in the group. An identification symbol unique to each group is affixed to all of the elements of the group.

---

This invention relates to educational devices and in particular to apparatus which will cause the child to assimilate algebraic concepts either with or without the aid of an instructor.

The teaching, scientific and business professions have become increasingly aware that children educated today require more thorough and comprehensive training in mathematics than at any time in the past. Computers are commonplace in business and are being applied to the solution of a wide variety of economic, social and military problems. If the child of today is to become a well-informed citizen, he will require more than a knowledge of arithmetic to comprehend the technological advances taking place in every field.

Complementing this appreciation for the need for greater scope in mathematical training is the realization that children can learn many mathematical concepts at a much earlier age tnan had previously been thought possible. However, such training, if it is to be effective, requires special methods and equipment which are suited to the age of the child.

Another area of importance is the training of the visually handicapped child. These children can, if provided with the proper training aids, learn many forms of mathematics almost as readily as those who are able to see normally.

One of the most important and basic areas of mathematics is algebra. We have found that this subject, which was once reserved for high school students, can be learned effectively by children in the elementary grades by means of the device we have invented. In fact, children as young as six years of age have demonstrated an understanding of equations after being exposed to our invention for a relatively short period.

Accordingly, it is an object of our invention to provide apparatus which can be used as an individualized, independent pupil activity or as a group-directed activity to enable children to grasp spontaneously algebraic concepts.

Another object is to provide apparatus which will permit visually handicapped children to grasp algebraic concepts as readily as those with normal vision.

Still another object is to provide apparatus which may be used to impart a clearer and more thorough understanding of algebraic concepts to any student of mathematics.

In accordance with our invention, there is provided a set of trays each having a base portion and a perimeter portion which surrounds the base portion. The surface area and shape of the base portion within each perimeter portion is identical and is preferably square. A set of indicia elements is also provided, each of the indicia elements having an identification symbol located on its surface. The number of indicia elements employed is determined by the number of trays in the tray set; that is, if there are N trays in the set then the number of indicia elements is at least $N(N+1)/2$.

The indicia elements are divided into N groups. Each group comprises a unique number of elements and each element in the group has a surface area equal to the area of the base portion of a tray divided by the number of elements in the group. Thus, in a set of 10 trays, there are at least 55 indicia elements divided into 10 groups. The first group contains one indicia element having a surface area equal to that of a tray, the second group contains two indicia elements each having an area equal to one-half that of a tray, the third group contains three elements each having surface areas equal to one third that of a tray, and so forth.

The identification symbol affixed to the elements in a group is the same and unique for that group. For example, the single element in the first group may be identified by the letter A, the two elements in the second group by the letter B, the three elements in the third group by C and the four elements in the fourth group by D. Two or more indicia elements may have different shapes yet be identified by the same identification symbol provided they have identical surface areas.

In employing our invention for teaching algebraic concepts, the student finds he has constructed algebraic sentences by placing different combinations of elements in the trays. For example, the student might place the single A element in one tray and the two B elements in a second tray. He might also find by experimentation that three C elements and four D elements require two trays. It would then become apparent to him that the algebraic sentence $A+2B=3C+4D$ is correct. Considerably more complex sentences can be constructed including those involving inequalities.

In a preferred embodiment of our invention, the perimeter portion of the tray consists of first, second, third and fourth rim sections each having an internal surface facing the base portion. The internal surfaces of the first and second rim sections are spaced apart and parallel as are the third and fourth sections, the third and fourth sections extending perpendicular to and between the first and second sections. The internal surfaces of the rim sections are slotted along the center of their entire length to receive the edges of the base portion. Thus, a two-sided tray is formed having a raised perimeter or rim on each side.

The above objects of and the brief introduction to the present invention will be more fully understood and further objects and advantages will become apparent from a study of the following description in connection with the drawings wherein:

FIG. 1 is a perspective view of a tray for use with our invention and FIG. 1a is a view of the internal surface of one of the rim sections;

FIG. 2 is a sectional view of the tray of FIG. 1 taken along the line 2—2 in FIG. 1;

FIG. 3 is a typical indicia element or block for use with a tray of the type shown in FIG. 1;

FIGS. 4a–4j are schematic representations of groups of indicia elements of the type shown in FIG. 3;

FIG. 5 illustrates our invention employed to illustrate a specific algebraic concept.

Figure 4A:
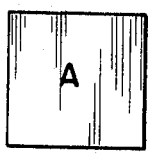
Figure 4B:
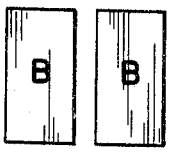
Figure 4C:
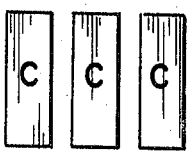
Figure 4E:
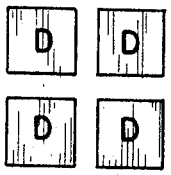
Figure 4E:
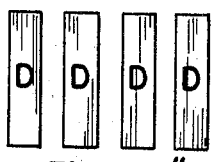
Figure 4E:
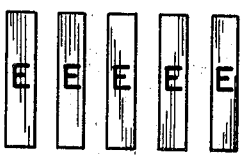
Figure 4F:
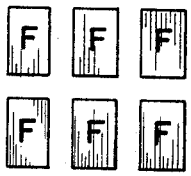
Figure 4G:
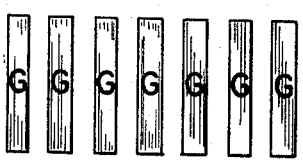
Figure 4H:
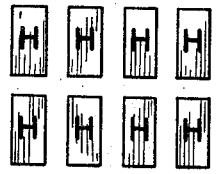
Figure 4I:
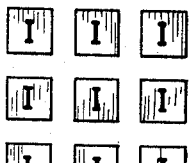
Figure 4J:
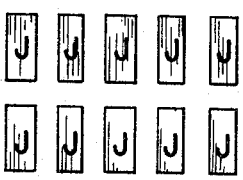

Referring to FIGS. 1, 1a and 2 there is shown a tray 10 of the type employed in our apparatus for teaching algebraic concepts to children. The tray consists of a square base portion 11 surrounded by a perimeter portion or rim 12. The rim 12 comprises four slotted sections 12a, 12b, 12c and 12d which join at the corners. The base 11 is inserted in the slots 13 located in the center of rim sections 12 thereby providing a two-sided tray. That is, the tray may be placed on a table with either side of the base 11 facing toward the child and be ready for use. This has been found to be a very useful feature when instructing young or handicapped children.

FIG. 3 shows, in perspective, a typical indicia element 14. The particular element shown is square, has an identification symbol D on both surfaces and an area equal to one fourth the area of the tray base section 11.

FIG. 4 is a schematic illustration of a set of indicia elements or blocks for use with a set of 10 trays. The number of blocks in the set of FIG. 4 is determined by the number of trays and must be at least $N(N+1)/2$ where N is the number of trays used. With $N=10$, at least 55 blocks are used divided into 10 sets. FIG. 4 actually illustrates 59 blocks since two types of D blocks are provided as shown in FIGS. 4d' and 4d''. The number of trays employed and therefore the number of blocks is determined by the age and ability of the child. With beginners who have limited mathematical background, only the 4 trays containing blocks A to D might be used at first. After all possibilities have been investigated, the next tray and set of blocks would be introduced followed by others as the pupil's skill increases.

In employing our invention, simple equations or number sentences would be employed at first. For example, $1A=2B$ would be constructed by placing the block A of FIG. 4a in one tray of the type shown in FIG. 1 and the two B blocks of FIG. 4b in an identical tray. It would then be clear to the pupil that the number sentence is correct.

A more complex example would be $5E+6F+7G=24H$. This would require one tray for the entire set of five E blocks of FIG. 4e since each has an area equal to one fifth that of the base 11 of tray 10, a second tray for the six F blocks (one sixth the area of base 11) and a third tray of the seven G blocks each of which have an area equal to one seventh that of base 11. The pupil would find that three complete sets of H blocks each block having an area equal to one eighth that of base 11 would be required to satisfy the number sentence thus proving it to be true.

Inequalities and negation may also be introduced at an early age. Thus, the question, "is $B+2D$ equal, less than, or greater than $5H+D$?" would lead the young child to construct the number sentence of FIG. 5 showing him that $B+2D$ is greater than $5H+D$, a concept we have found he is unlikely to master in any other way.

Figure 6:
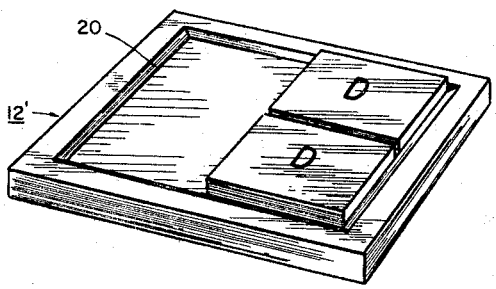
FIG. 6 depicts another embodiment of the invention.

FIG. 6 illustrates an embodiment of our invention wherein the rim 12 is beveled inward as shown at 20 so that the blocks may be removed quite easily. This is particularly helpful when the child is young or visually handicapped.

Summarizing we have invented apparatus for teaching algebraic concepts to children with limited mathematical backgrounds. The presentation has been found to be stimulating and productive and, since the child always knows whether or not a sentence is correct it can be used without close supervision. The student will discover more involved and complex sentences with limited or no further suggestions.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. Educational apparatus for the teaching of algebraic concepts comprising
   (a) a set of N trays each having a base portion and a perimeter portion surrounding said base portion, N being any positive integer, the base portion of each of said N trays having the same area,
   (b) a set of at least $N(N+1)/2$ indicia elements comprising N groups of elements, each group consisting of a unique number of elements from 1 to N, the elements in each group having an area equal to that of the base portion of one of said trays divided by the number of elements in the group, some of the elements of at least one of said groups together with at least one of the elements of another group being positionable in combination on one of said trays, with the elements of said one group being arranged along at least one longitudinal side of the element of said another group, and
   (c) identification symbols located on the surface of each of said indicia elements, the element in each of said groups having the same identification symbols.

2. Educational apparatus as defined by claim 1 wherein the perimeter portion of said tray consists of first, second, third and fourth elongated rim sections each having an internal surface, the internal surfaces of said first and second rim sections being spaced apart and parallel and the internal surfaces of said third and fourth rim sections being spaced apart and parallel, said third and fourth sections extending perpendicular to and between the ends of said first and second sections, the base portion of said tray being secured to the internal surfaces of said first, second, third and fourth rim sections at the center thereof to form a tray having first and second sides each adapted to receive said indicial elements.

3. Educational apparatus as defined by claim 1 wherein the perimeter portion of said tray consists of first, second, third and fourth elongated rim sections each having an internal surface, the internal surfaces of said first and second rim sections being spaced apart and parallel and the internal surfaces of said third and fourth rim sections being spaced apart and parallel, said third and fourth sections extending perpendicular to and between the ends of said first and second section, the internal surfaces of said first, second, third and fourth rim sections being slotted longitudinally along the center thereof to receive the edges of said base portion.

4. Educational apparatus as defined by claim 1 wherein said base portion is in the shape of a square.

5. Educational apparatus as defined by claim 2 wherein said rim sections are linear and equal in length, said rim sections including a square area of said base section.

6. Educational apparatus as defined by claim 4 wherein said rim sections are beveled inwardly to facilitate removal of said indicia elements.

References Cited

UNITED STATES PATENTS

| | | | |
|---|---|---|---|
| 3,171,217 | 3/1965 | Birdsall | 35—31.4 |
| 3,212,201 | 10/1965 | Jensen | 35—70 XR |
| 3,229,388 | 1/1966 | Smith | 35—31.8 XR |

FOREIGN PATENTS 864,891  4/1961  Great Britain.

EUGENE R. CAPOZIO, *Primary Examiner.*

WILLIAM H. GRIEB, *Assistant Examiner.*

U.S. Cl. X.R.

35—72